US006254427B1

(12) United States Patent
Stathis

(10) Patent No.: US 6,254,427 B1
(45) Date of Patent: Jul. 3, 2001

(54) POWER AND COMMUNICATIONS GROMMET

(75) Inventor: Peter Stathis, Bloomfield Hills, MI (US)

(73) Assignee: Doug Mockett & Company, Inc., Torrance, CA (US)

( * ) Notice: Subject to any disclaimer, the term of this patent is extended or adjusted under 35 U.S.C. 154(b) by 0 days.

(21) Appl. No.: 09/500,316

(22) Filed: Feb. 8, 2000

Related U.S. Application Data

(63) Continuation-in-part of application No. 09/003,731, filed on Jan. 7, 1998, now Pat. No. 6,024,599.

(51) Int. Cl.[7] .............................. H01R 13/60; H02G 3/22
(52) U.S. Cl. .............................. 439/535; 312/223.6
(58) Field of Search .............................. 439/535, 537, 439/638, 642–646, 650–652; 361/428; 312/223.6; 108/50

(56) References Cited

U.S. PATENT DOCUMENTS

| | | | | |
|---|---|---|---|---|
| 3,883,202 | | 5/1975 | Konig . | |
| 4,372,629 | | 2/1983 | Propst et al. . | |
| 4,551,577 | | 11/1985 | Byrne . | |
| 4,654,756 | * | 3/1987 | Wilson et al. | 361/428 |
| 4,747,788 | | 5/1988 | Byrne . | |
| 4,828,513 | | 5/1989 | Morrison et al. . | |
| 4,864,078 | | 9/1989 | Bowman . | |
| 5,149,277 | | 9/1992 | Le Master . | |
| 5,231,562 | | 7/1993 | Pierce et al. . | |
| 5,272,988 | * | 12/1993 | Kelley et al. | 108/50 |
| 5,351,173 | | 9/1994 | Byrne . | |
| 5,516,298 | * | 5/1996 | Smith | 439/131 |
| 5,765,932 | * | 6/1998 | Domina et al. | 312/223.6 |

* cited by examiner

*Primary Examiner*—Hien Vu
*Assistant Examiner*—Shanetta D. Ore
(74) *Attorney, Agent, or Firm*—Sanford Astor

(57) ABSTRACT

A grommet adapted to be placed through an aperture in a work surface, such as a desk. A lip, with a diameter larger than the aperture in the work surface, is located at the top of the housing, or body of the grommet, so that the lip rests over the aperture in the desk while the housing of the grommet passes through the aperture, so that the great majority of the grommet lies below the surface of the work surface. The grommet contains a plurality of electrical plugs and/or a plurality of data modular couplers for communication terminals so that power and communications wires may be passed over the lip of the grommet and down into the housing to be connected inside of the grommet. The grommet has a power wire connected near the base of the grommet, for connection to a power source, such as a wall plug. Communication and data wires connect to a communication source, such as a telephone plug. A cover or cap fits over the top of the housing to cover the incoming wires and the connections within, while leaving a space between the top of the housing and the cover so that the wires may pass through, or is adapted to fit flush with the top of the housing and overlap the lip when no wires are passing through.

16 Claims, 9 Drawing Sheets

POWER AND COMMUNICATIONS GROMMET

This application is a continuation in part of U.S. application Ser. No. 09/003,731, filed on Jan. 7, 1998, now U.S. Pat. No. 6,024,599.

BACKGROUND OF THE INVENTION

The practical handling of power and data wiring in the workplace is a serious problem. Desktops and other work surfaces are all too often badly cluttered with a plurality of wires running across the desk in a haphazard manner. In addition, desktop devices often have to be plugged in when in use and unplugged when not in use or moved to other locations. Often this requires bending down under the work surface trying to find the wall outlet.

There has been a need for an efficient and yet aesthetic manner to handle these multiple wires that are needed in the work area. It has been known to have a retractably mounted receptacle for this purpose as shown in U.S. Pat. Nos. 4,747,788 and 5,351,173. These designs, however, suffer from the problem that the device must be pulled up from the work surface, the plugs inserted, and then the device pushed back down below the desk surface. This causes unneeded work on the part of the user and the unit also suffers from possible breakage due to the repeated movement of the device from the open to closed positions using a fragile release mechanism. In addition, the wires plugged into the wall sockets are pulled up each time the device is raised, causing additional problems.

Our parent application referred to above, provides a power and communications grommet that is an improvement over those shown in the prior art. This application provides improvements over the embodiments described in our parent application.

SUMMARY OF THE INVENTION

The power and communications device of this invention comprises a grommet adapted to be placed in an aperture in a desk or other work surface. An aperture is manufactured or drilled through the top of the work surface. A housing, adapted to fit into the aperture, contains a plurality of electrical receptacles and a plurality of data ports or communication receptacles. Cords adapted to plug into a power source, such as a wall socket or communications receptacle, are connected near the bottom of the housing. The communication receptacles comprise modular couplers so that communication wires, such as telephone, fax, modem wires, or any other plugs for specialty purposes, can be brought up and plugged into the base of the housing while the work surface operating devices, such as computers or telephones, are plugged in through the top of the housing.

Once inserted into the work surface the housing does not have to be moved, lifted or retracted in order to use it. The housing can, if desired, be fastened to the work surface by gluing or other convenient means. This is done by providing a lip, with a diameter larger than the aperture in the work surface, which is located at the top of the housing or body of the grommet so that the lip rests over the aperture in the work surface while the body of the grommet passes through the aperture. Thus, the great majority of the grommet lies below the surface of the desk or work surface, out of the way, and remains in that position. The electrical plugs or communication wires are simply plugged into the housing by reaching down into the grommet and plugging the plug or coupling into the receptacles in the housing.

Openings are provided which pass completely through the grommet in order to push excess wires or cords into or through the grommet, to remove them from the top surface of the work surface.

An attractive cap or cover is placed over the top of the housing, hiding the receptacles but leaving a space betwen the cap and housing for the wires to pass into the housing. The cover is easily removable and protects the interior of the housing as well as providing an attractive appearance to the work surface. If the unit is not in use, i.e. no wires are plugged in, the cap may be rotated so that it drops flush to the top of the housing, overlapping the lip, leaving no space between the cap and the housing, providing a nearly flat work surface.

OBJECTS OF THE INVENTION

Accordingly, several objects and advantages of the invention are as follows:

It is an object of the present invention to provide a simple and convenient device which contains power and data receptacles at a work surface.

Another object of the invention is to provide a power and communications grommet which can easily be added to any existing work surface.

Yet another object of the invention is to provide a simple, convenient, attractive and yet inexpensive device which brings the connections for power and data cords, wires or cables to the work surface, thus eliminating the need to find the wall plug or data terminal.

DETAILED DESCRIPTION OF THE INVENTION

Figure 1:
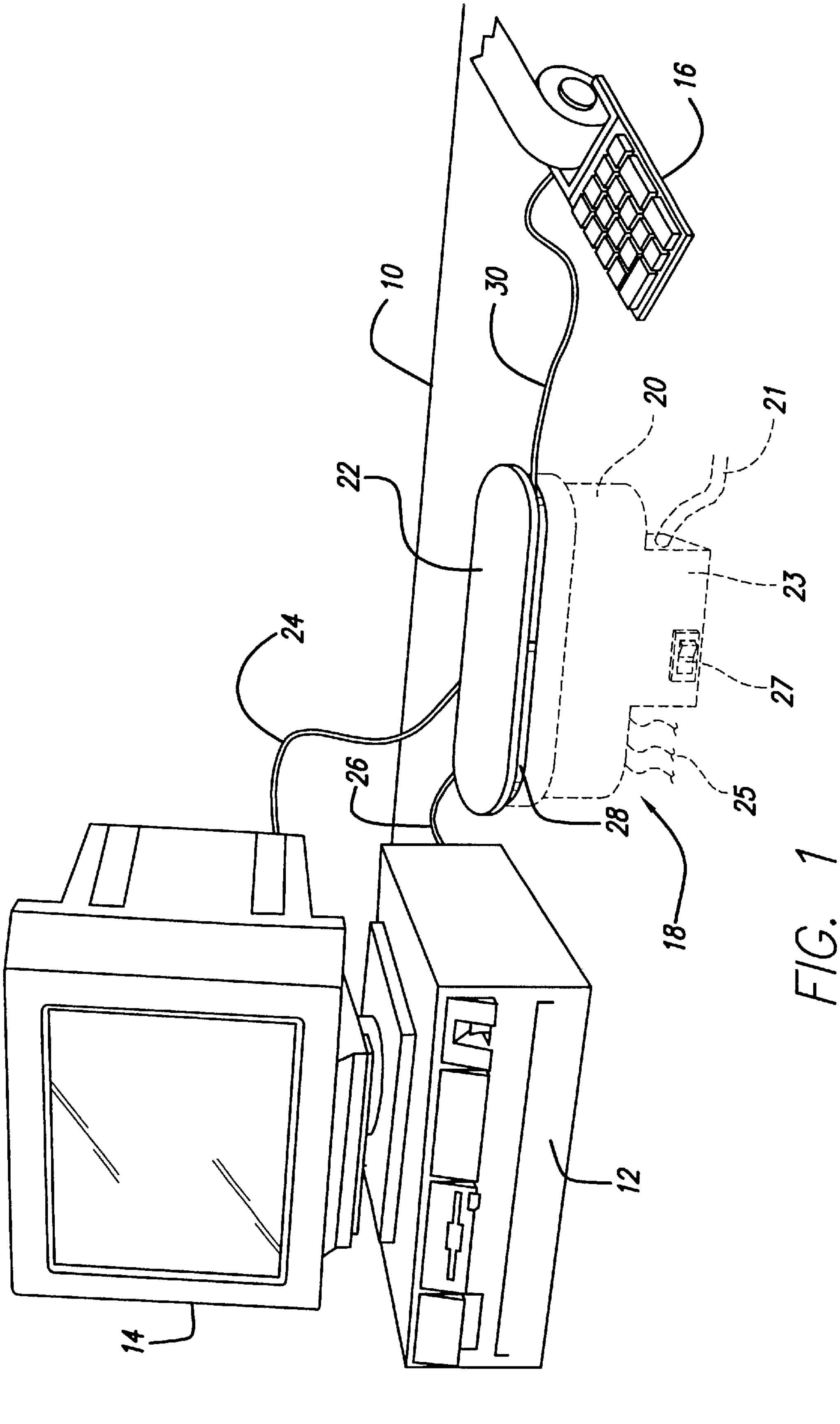
FIG. 1 is a perspective view of the device of the invention in place in a work surface.

Referring now to FIG. 1, there is shown a work surface 10 on which there is stationed a computer CPU 12, a computer monitor 14 and an adding machine 16. The power and communications grommet 18 of this invention is shown with the housing or body 20 of the grommet below the work surface 10 and an electrical power cord 21 exiting the lower portion 23 of housing 20. Cap, or cover, 22 fits over the top of housing 20. Electrical power wires 24 from monitor 14 and 26 from CPU 12, pass through space 28 between cap 22 and body 20 of grommet 18. Connection power wire 30 from adding machine 16 does the same. Communication wires 25 exit from the lower portion 23 of housing 20. A circuit breaker/reset button is located in the lower portion 23 of housing 20.

Referring to FIGS. 2 through 8, there is shown housing 20 and removable cap 22. Cap 22 has a plurality of irregularly spaced legs 30, 32, 34, 36 and 38. Any number of legs, but at least three, may be employed as desired, so long as they support cap 22 above housing 20. Each of the legs may have an angle cut 39 across the leg, towards the inside of housing 20, which provides additional space inside of housing 20.

Housing 20 has an internal ledge or ridge 40 which runs along the inside surface 42 of housing 20. Ledge 40 has a plurality of irregularly spaced slots, 44, 46, 47, 49 and 51. There are the same number of slots in ledge 40 as there are legs. The legs are located so that each leg matches and fits into a slot when cap 22 is placed on housing 20 in one direction, allowing the underside 41 of cap 22 to drop onto, and rest against, lip 48 of housing 20 (see FIG. 7).

When cap 22 is placed on housing 20 in the opposite direction, the legs do not match up with the slots and the legs rest on ledge 40, (see FIG. 8) so that cap 22 is then raised above lip 48 and the top of housing 20, leaving space 28 between cap 22 and lip 48 through which wires may pass. Lip 48 is larger in diameter than housing 20 and lip 48 rests over the hole which has been made in the work surface.

In use, an aperture large enough to fit housing 20 of grommet 18 is manufactured or made in the top of work surface 10. Housing 20 can then fit through and will lie beneath the surface of work surface 10 while lip 48, larger in diameter than the aperture in work surface 10, stops housing 20 from falling through the aperture in work surface 10.

If the grommet is not in use and no wires are plugged in, cap 22 can be rotated, so that legs 30, 32, 34, 36, and 38 drop into corresponding slots 44, 46, 47, 49 and 51. Cap 22 will then rest flush on the top of lip 40 leaving a virtually flat work surface and no open space.

Figure 7:
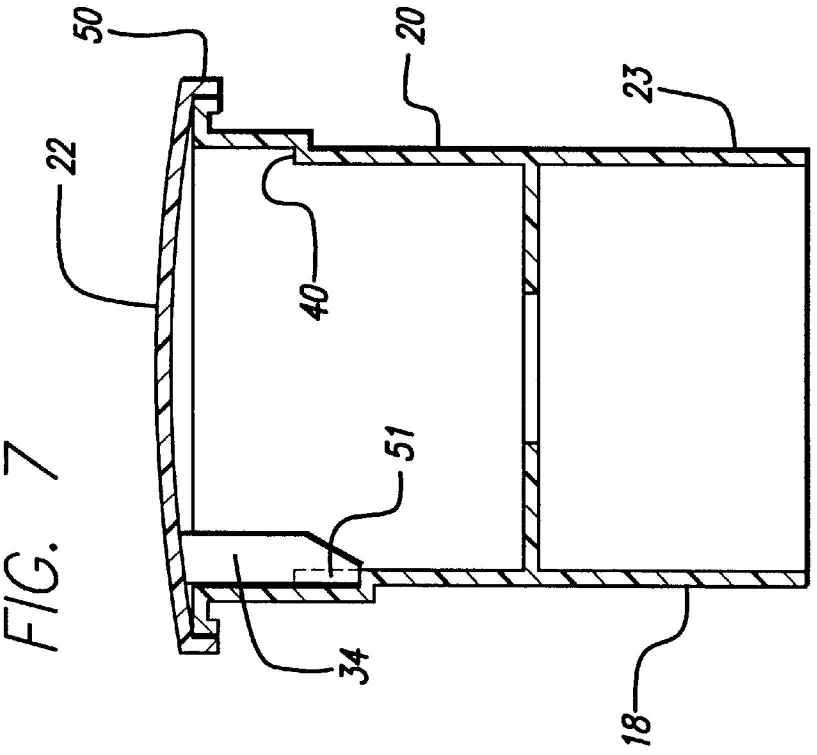
FIG. 7 is a cross-section taken on lines 7—7 of FIG. 3.

Cap 22 has overlap 50, descending from the underside or reverse surface 41 of cap 22 around its entire circumference, which overlaps the edge of lip 48 (see FIG. 7). Overlap 50 effectively seals the circumference 48 of housing 20 so that no liquid or other material may get into housing 20 when the cap is lowered onto lip 48 of housing 20.

Figure 6:
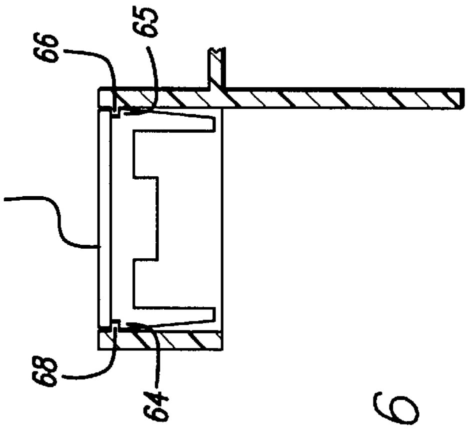
FIG. 6 is a cross-section taken on lines 6—6 of FIG. 5.
Figure 8:
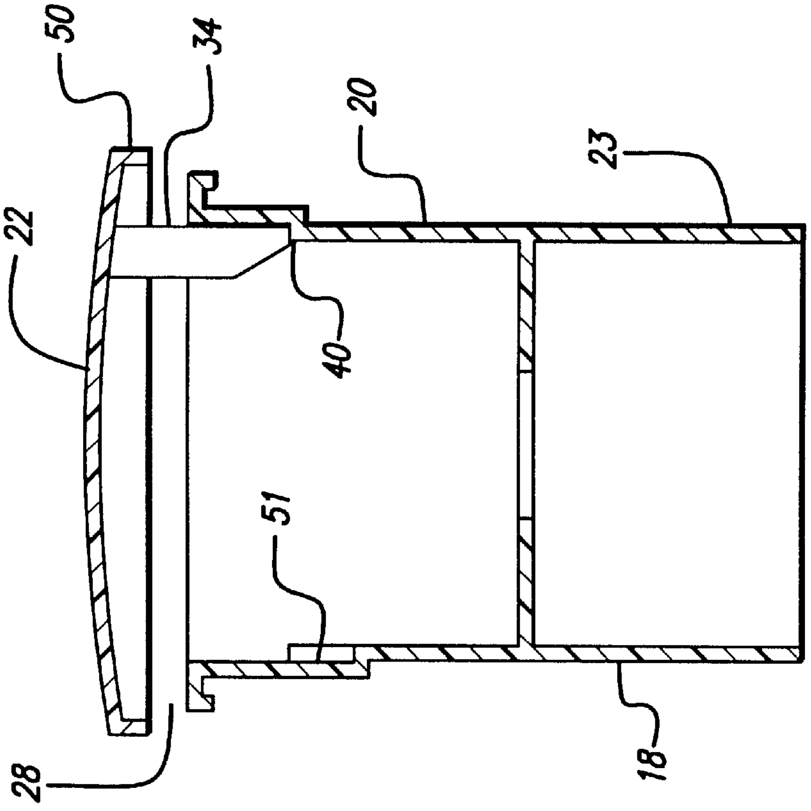
FIG. 8 is a cross-section taken on lines 8—8 of FIG. 4.

Housing 20 has a plurality of electrical receptacles 52, 53, 54, and 55. A plurality of data modules 56, 57 and 58 are located in open area 59 of housing 20, adjacent electrical 52. Each data module snaps into place with flexible snap connectors 60, 62, and 64, which snap into place below ledges or ridges 66 and 68 of housing 20. FIG. 6 shows data module 58 in more detail, with flexible snap connectors 64 and 65 locking below ledges 66 and 68 of housing 20. These snap-in modules are well known such as those manufactured by Leviton Corp., Wire-Mold Corp., and others.

There are a large variety of other snap-in data modules, which may be slightly different depending upon the manufacturer. These include microphone plugs, local area network (LAN) plugs, and many other types of specialty plugs. Any of these may be utilized Each snap-in module is removably inserted, as shown, so that it may be replaced by another type of data module without having to replace the entire grommet.

Power cable 21 passes from the lower portion 23 of housing 20 to be plugged into a power source such as an electrical wall plug. Wires 25 depend from the data modules 56, 57 and 58 to be connected to the outside source.

Housing 20 is closed on the bottom to keep the unit free of dust, dirt and moisture. Cap 22 provides both an attractive cover and protection for the unit, to prevent anything being inadvertently dropped in, such as coffee. Cap 22 may be slightly convex as shown, if desired for aesthetic reasons. Circuit breaker/reset button 27 is provided to protect against overload.

There are also provided two open spaces 82 and 84 which pass completely through housing 20, from top to bottom. Openings 82 and 84 serve two purposes. First, excess wires or cords may be pushed from the work surface into the grommet and out openings 82 and 84, so that all excess wires are pushed below and off of the work surface. Second, if desired, a wire or cord may be passed completely through the grommet and be plugged directly into the wall or communication receptacle. This gives the grommet of this invention tremendous versatility in the manner in which it can be utilized.

Figure 9:
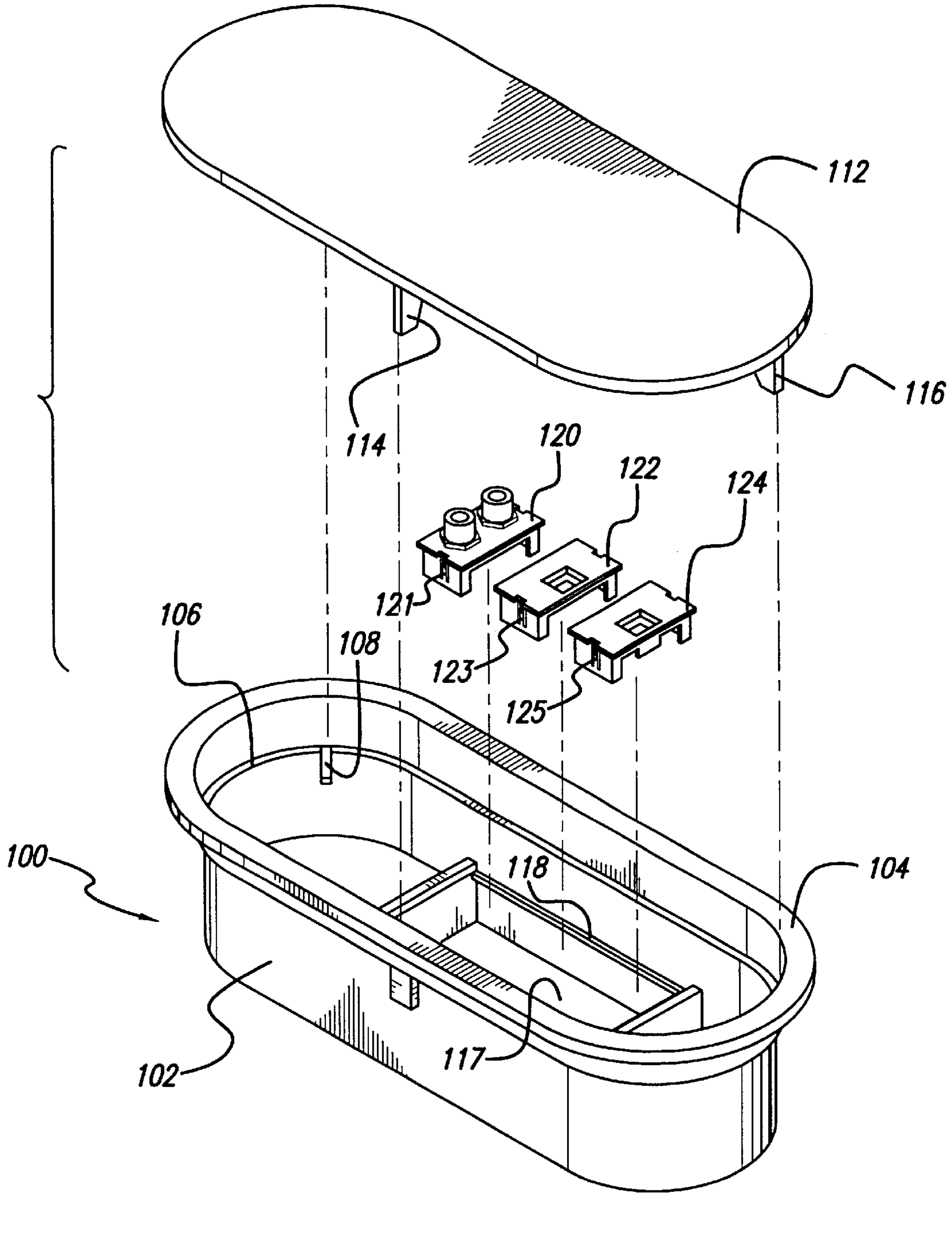
FIG. 9 is a perspective view of another embodiment.
Figure 10:
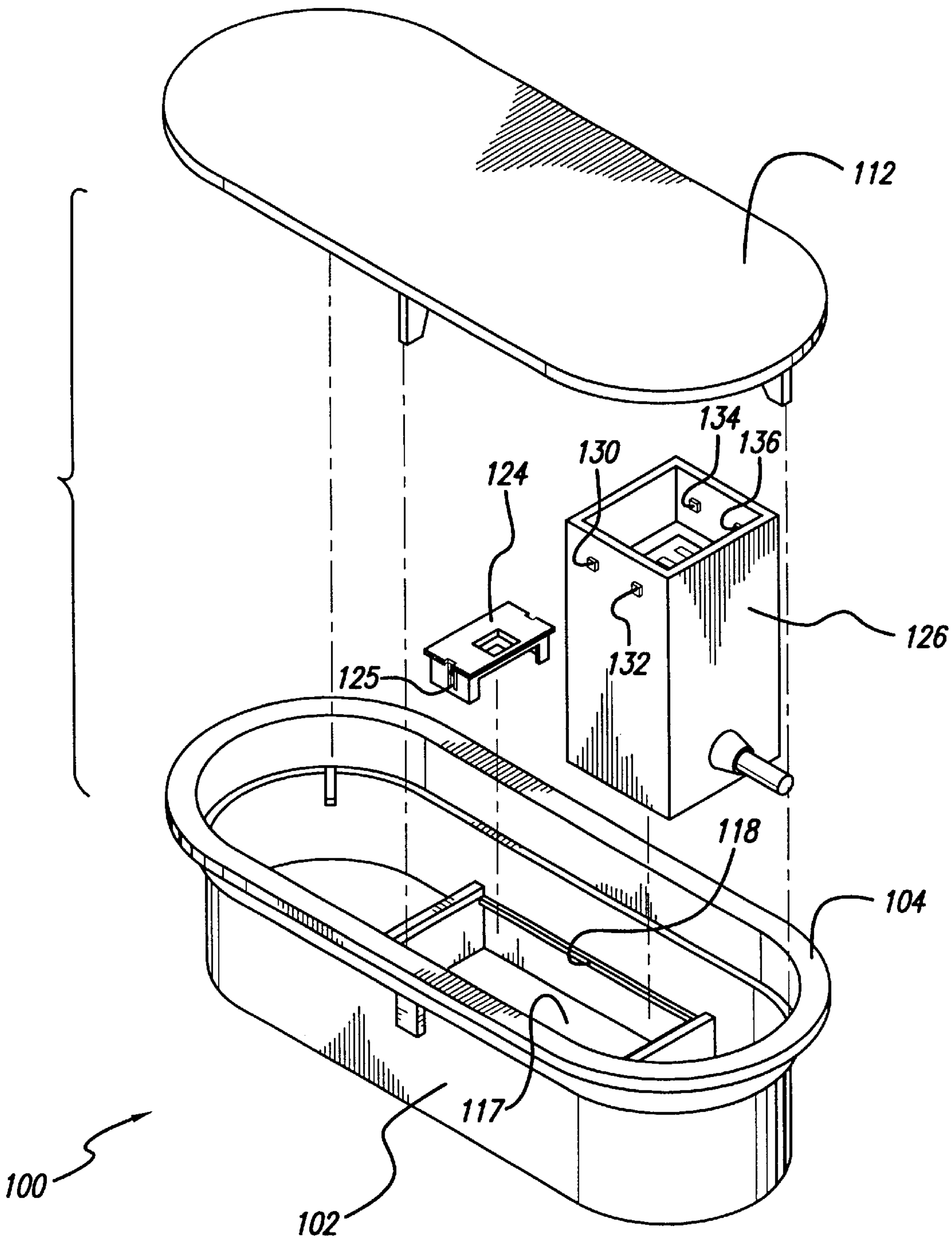
FIG. 10 is a perspective view of another embodiment.
Figure 11:
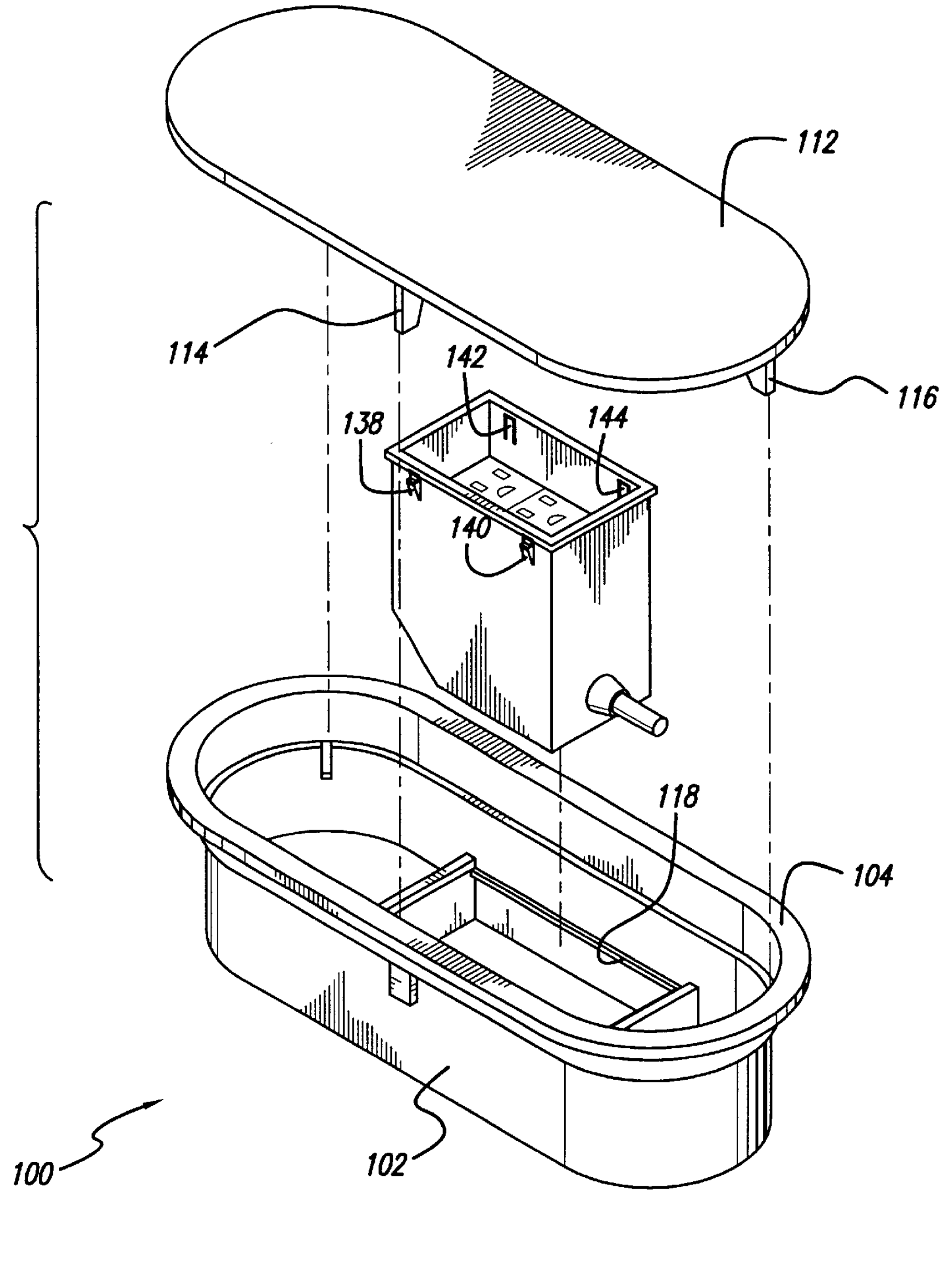
FIG. 11 is a perspective view of another embodiment.

Referring now to FIGS. 9, 10 and 11 there is shown an alternate embodiment of a smaller sized electrical grommet of this invention. Grommet 100 comprises housing 102 with lip 104. Housing 102 has slot 108, as well as other slots similar to grommet 18, adapted to receive legs 114 and 116 of cap 112, and other legs, not shown.

Figure 2:
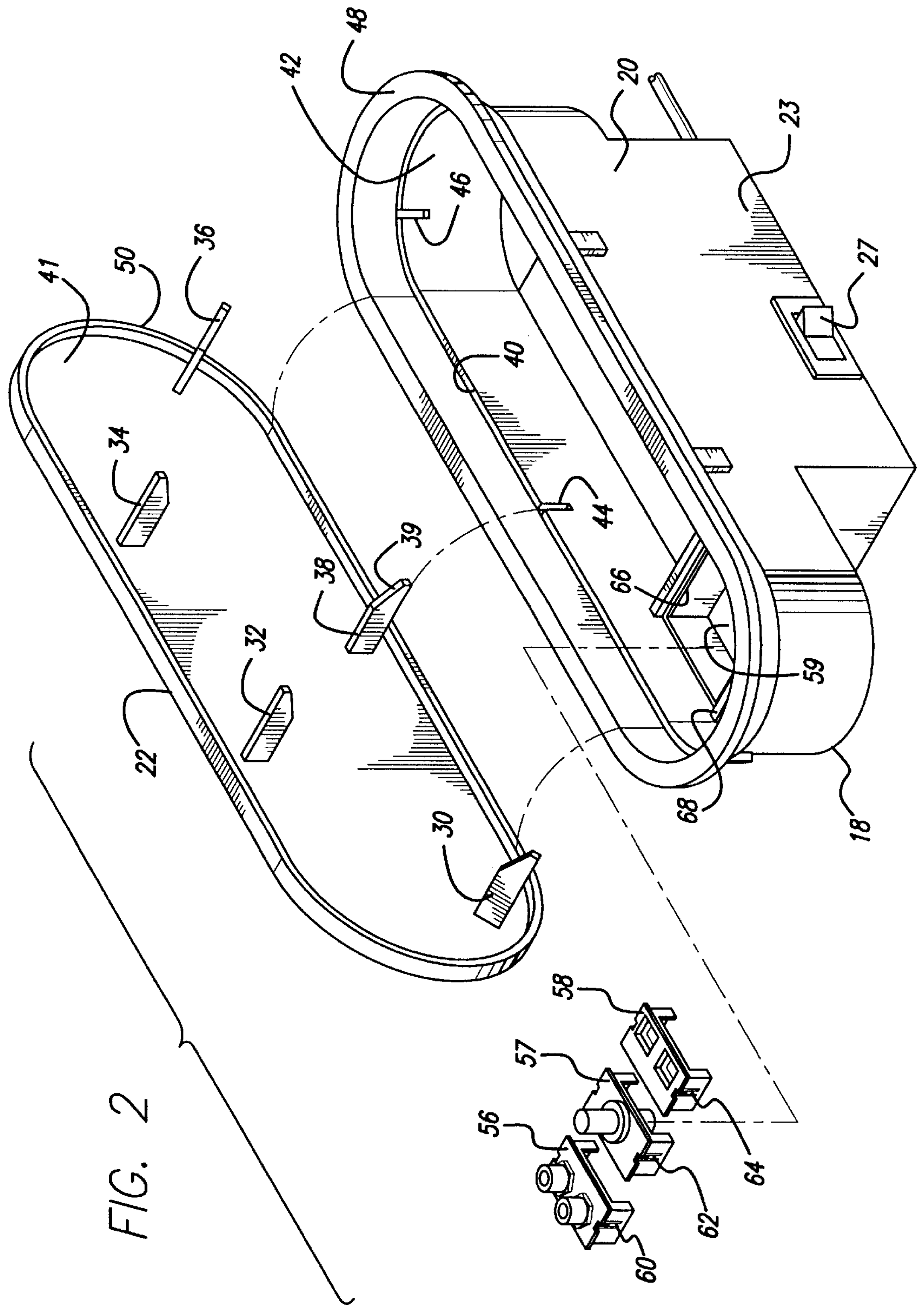
FIG. 2 is a perspective view of the device.
Figure 3:
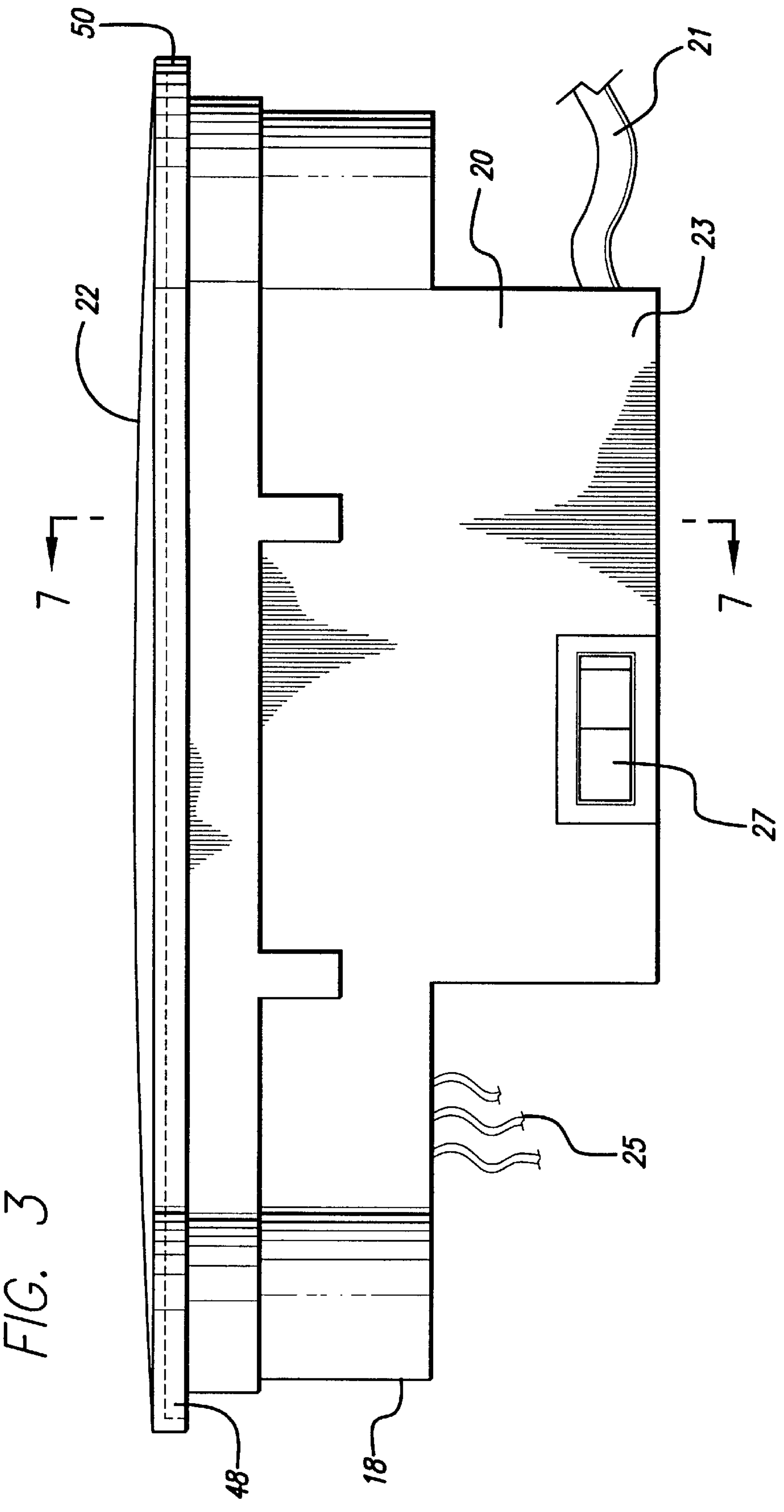
FIG. 3 is a side elevation view of the housing.
Figure 4:
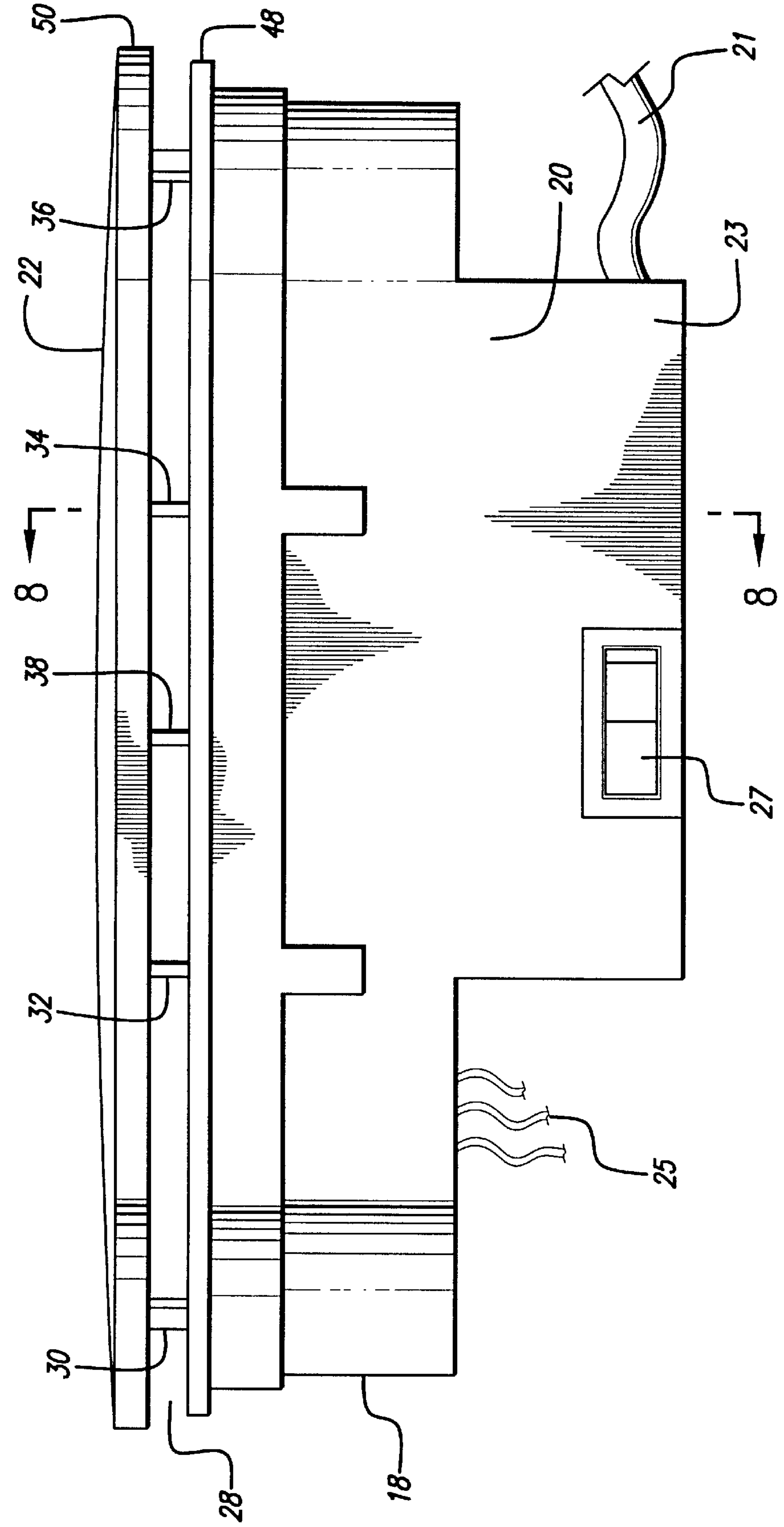
FIG. 4 is a side elevation view of the housing.
Figure 5:
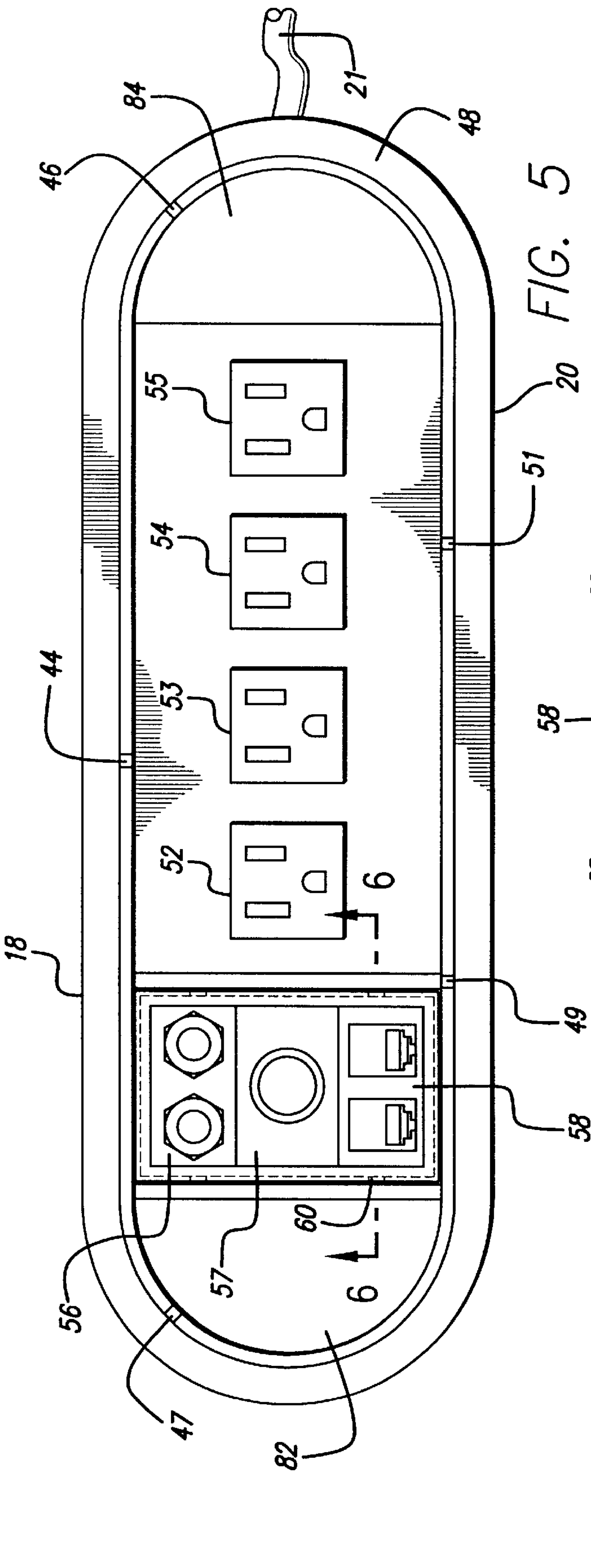
FIG. 5 is a top plan view.

Housing 102 has receptacle area 117 with side ledges 118, and an opposite side ledge, not shown, similar to ledges 66 and 68 of FIG. 2, to receive snap-in data modules 120, 122, and 124, which are the same snap-in data modules as described in FIGS. 2–8. Receptacle 118 may be fitted with a plurality of data modules as in FIG. 9, one data module 124 and one electrical receptacle 126 as shown in FIG. 10 or a unit 128 having two electrical receptacles. Each of these units snaps into place under ledges 118, and its opposide side ledge of receptacle 117, with flexible snap connectors 130, 132, 134, and 136 shown in FIG. 10 and 138, 140, 142, and 144, shown in FIG. 11.

The particular shape and size of the grommet depends upon the number and type of receptacles and ports desired as well as the shape desired by the particular designer. The grommet operates in the same manner regrdless of shape or size. An aperture is manufactured into the work surface, or may be cut into any existing work surface, through which the housing is placed, held by the larger lip which rests on the work surface. Slots can be cut into the lip to fit the stepped legs of the cap, if it desired to close the top when no wires are passed through. The legs of the cap are only slightly larger in diameter than the housing so that the cap may easily be reversed to either sit above the housing on the step in its legs, to create the opening for the wires or, simply by reversing the cap, no matter which shape is utilized, the cap may rest flush against the housing to close the opening.

Having thus described the invention,

I claim:

1. A power and communications grommet for a work surface comprising, a housing adapted to fit through an aperture in the work surface, the housing containing either power or communication receptacles, or a combination thereof, the housing having a lip larger than the aperture, a cap adapted to fit over the top of the housing, said cap having an overlap which overlaps the lip of the housing, a plurality of legs attached to the underside of the cap adapted to hold the cap raised above the top of the housing by said legs resting on an internal ledge on the inside of the housing, providing a space between the cap and the housing for power and communication lines to be inserted into the grommet, the internal ledge having a plurality of slots cut therein to receive each of said legs, when not in use.

2. The grommet of claim 1 in which the legs are irregularly spaced.

3. The grommet of claim 2 in which each of the legs has an angle cut across the body of the leg.

4. The grommet of claim 1 in which the receptacles comprise a plurality of power receptacles, and a plurality of communications receptacles.

5. The grommet of claim 1 comprising means to connect snap-in power and communication modules in the housing.

6. The grommet of claim 1 in which each slot matches a leg when the cap is set in one direction and fails to match a leg when the cap is placed in the opposite direction.

7. The grommet of claim 1 further comprising a circuit breaker, reset switch in the housing.

8. The grommet of claim 1 in which the cap has a convex top surface.

9. A power and communications grommet for a work surface comprising, a housing adapted to fit through an aperture in the work surface, the housing containing either power or communication receptacles, or a combination thereof, the housing having a lip larger than the aperture, a cap adapted to fit over the top of the housing, said cap having an overlap which overlaps the lip of the housing, a plurality of irregularly spaced legs attached to the underside of the cap adapted to hold the cap raised above the top of the housing by said legs resting on an internal ledge on the inside of the housing, providing a space between the cap and the housing, a plurality of slots cut into the ledge to receive each of said legs, so that the cap may rest flush on the top of the housing.

10. The grommet of claim 9 in which each of the legs has an angle cut across the body of the leg.

11. The grommet of claim 9 in which the receptacles comprise a plurality of power receptacles and a plurality of communications receptacles.

12. The grommet of claim 9 comprising means to connect snap-in power and communication modules in the housing.

13. The grommet of claim 9 in which each slot matches a leg when the cap is set in one direction and fails to match a leg when the cap is placed in the opposite direction.

14. The grommet of claim 9 further comprising a circuit breaker, reset switch in the housing.

15. The grommet of claim 9 in which the cap has a convex top surface.

16. The grommet of claims 1 or 9 further comprising one or more openings completely through the housing, to allow wires to pass completely through the housing.

* * * * *